United States Patent
Esterby et al.

(10) Patent No.: US 6,254,511 B1
(45) Date of Patent: Jul. 3, 2001

(54) METHOD AND APPARATUS FOR ADAPTIVELY CONTROLLING CLUTCHES BASED ON ENGINE LOAD

(75) Inventors: James D. Esterby, Peoria; Timothy A. Lorentz, Morton; Jeffrey T. Ryan, Washington; Kevin A. Vernagus, East Peoria, all of IL (US)

(73) Assignee: Caterpillar Inc., Peoria, FL (US)

( * ) Notice: Subject to any disclaimer, the term of this patent is extended or adjusted under 35 U.S.C. 154(b) by 0 days.

(21) Appl. No.: 09/429,844

(22) Filed: Oct. 29, 1999

(51) Int. Cl.[7] .......................... F16H 61/04; F16H 61/06; F16H 61/08
(52) U.S. Cl. ............................................. 477/143; 477/121
(58) Field of Search .................................... 477/143, 144, 477/156, 158, 159

(56) References Cited

U.S. PATENT DOCUMENTS

| | | | |
|---|---|---|---|
| 4,463,427 | * 7/1984 | Bonnetain et al. | 364/442 |
| 4,475,380 | * 10/1984 | Colovas et al. | 73/114 |
| 4,843,916 | 7/1989 | Bouta | 74/866 |
| 5,284,119 | * 2/1994 | Smitley | 123/497 |
| 5,454,767 | 10/1995 | Clausen et al. | 477/32 |
| 5,475,591 | 12/1995 | Suzuki et al. | 364/424.1 |
| 5,510,982 | 4/1996 | Ohnishi et al. | 364/424.1 |
| 5,588,936 | 12/1996 | Uchida et al. | 477/155 |
| 5,688,207 | 11/1997 | Uchida et al. | 477/155 |
| 5,778,329 | * 7/1998 | Officer et al. | 701/55 |
| 6,023,988 | * 2/2000 | McKee et al. | 74/336 R |
| 6,044,806 | * 4/2000 | Brown et al. | 123/27 GE |
| 6,082,331 | * 7/2000 | Barnes et al. | 123/446 |

* cited by examiner

Primary Examiner—Sherry Estremsky
Assistant Examiner—Tisha D. Lewis
(74) Attorney, Agent, or Firm—John W. Morrison

(57) ABSTRACT

A drive line assembly for a work machine is disclosed. The drive line assembly includes an engine driving an engine output shaft and an engine speed sensor which generates engine speed signals indicative of a speed of the engine output shaft. The drive line assembly further includes a fuel injector operable to regulate fuel flow to the engine and a transmission driven by the engine output shaft and having a first on-coming clutch. The drive line assembly yet further includes a controller operable to determine the engine speed from the engine speed signals and determine the fuel flow through the fuel injector. The controller is further operable to determine an engine load based on the fuel flow and a predetermined maximum fuel flow for the engine at the engine speed and control engagement of the first on-coming clutch based on the engine load. A method for controlling a drive line assembly is also disclosed.

22 Claims, 4 Drawing Sheets

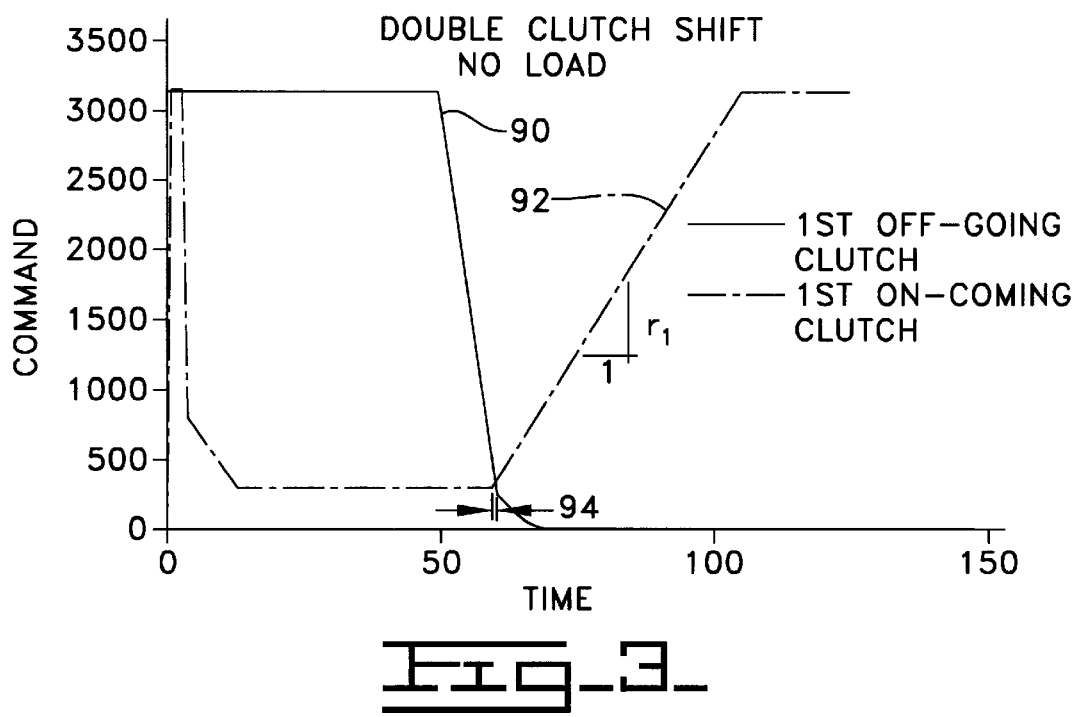
Fig-3-
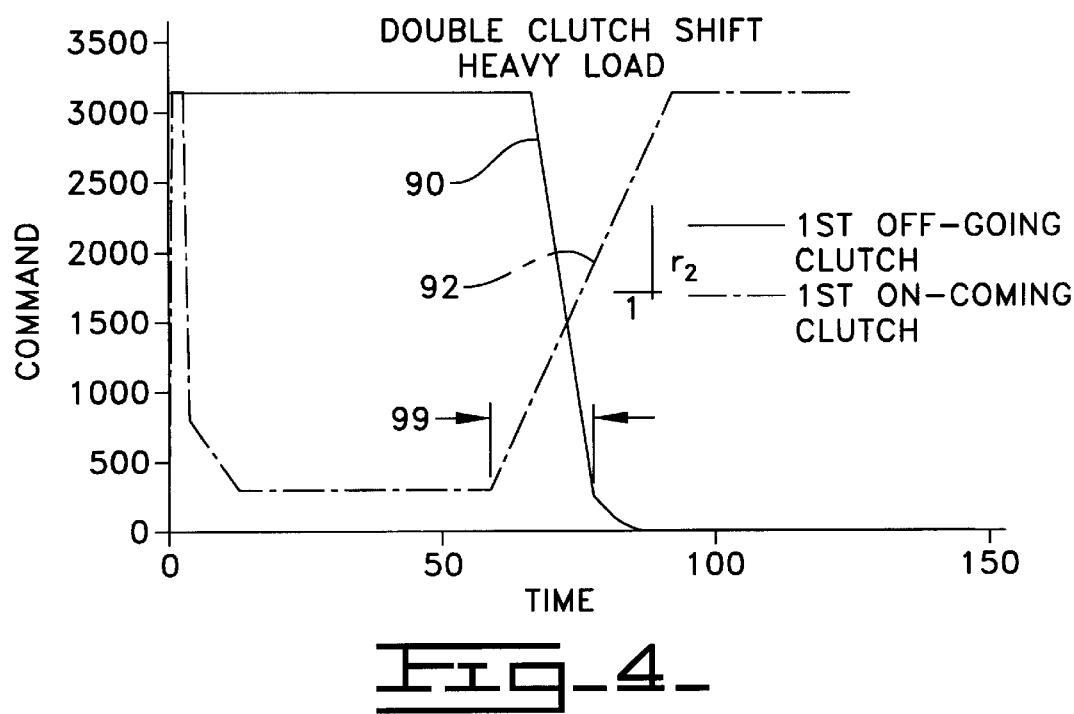
Fig-4-

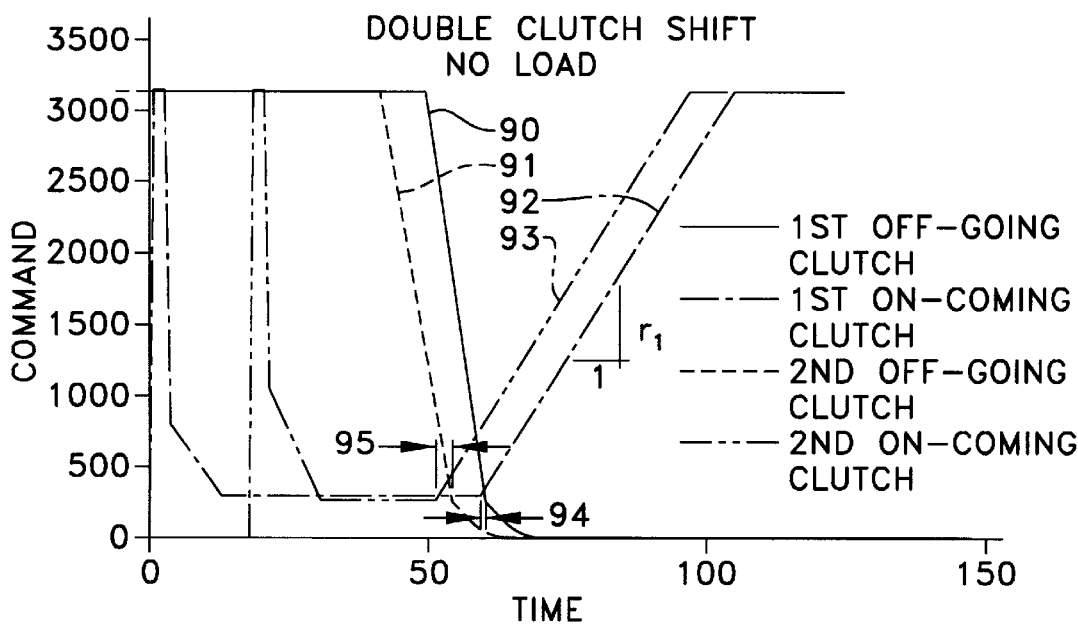
Fig-5-
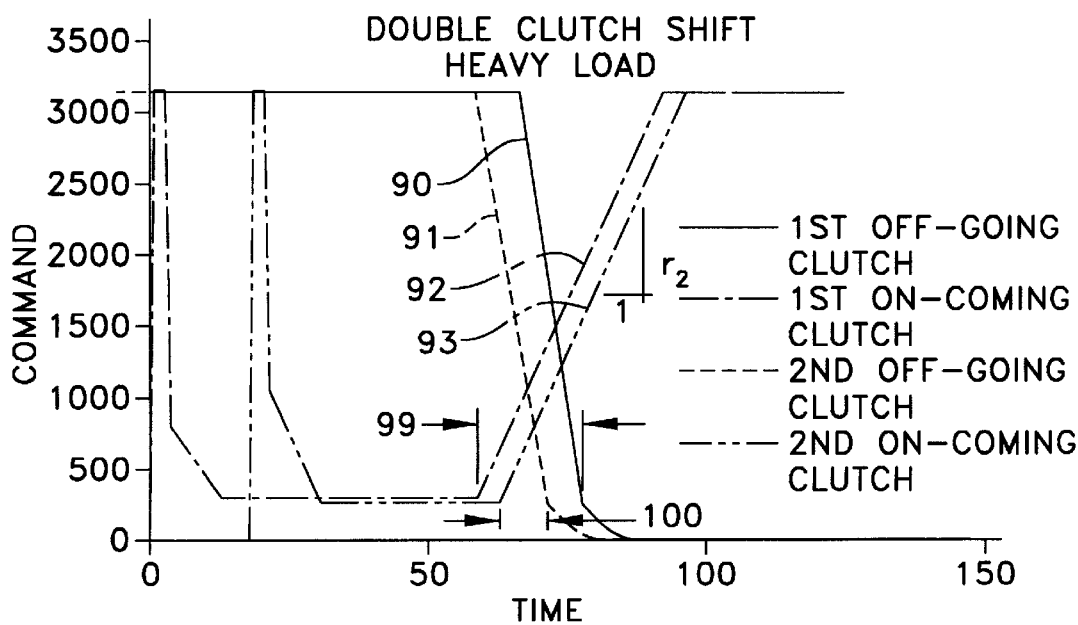
Fig-6-

METHOD AND APPARATUS FOR ADAPTIVELY CONTROLLING CLUTCHES BASED ON ENGINE LOAD

TECHNICAL FIELD OF THE INVENTION

The present invention generally relates to a transmission, and more specifically to a method and apparatus for adaptively controlling clutches based on engine load.

BACKGROUND OF THE INVENTION

Powershift transmissions are used in a variety of work machines where it is desirable to shift gears without interrupting the torque flow through the transmission. To this end, powershift transmissions generally have a clutch overlap period whereby both an off-going and an on-coming clutch are engaged at the same time. If this overlap period is too short, then there will be a torque interruption to an output shaft prior to the engagement of the on-coming clutch. If the overlap period is too long, then the shift will appear to be slow and the transmission will be exposed stresses which can potentially reduce the life of various transmission components.

In addition, a single overlap period may not be desirable for all load conditions. In particular, under high load conditions, it is desirable to increase the overlap period to effectively complete the gear shift. On the other hand, under light load conditions, it is desirable to decrease the overlap period to effectively complete the shift. Moreover, the rate in which the on-coming clutch is engaged may also be varied to improve the shift. Under high load conditions, it is desirable to increase the rate at which the on-coming clutch is engaged whereas under low load conditions, it is desirable to decrease the rate which the on-coming clutch is engaged.

Another problem may arise during double clutch shifts where a pair of on-coming clutches are engaged to accomplish a gear shift. During double clutch shifts, the inertia of a first clutch may be greater than the inertia of a second clutch. It may be desirable to engage the first clutch earlier than the second clutch to compensate for the change in relative inertia of the clutches. Similarly, under different load conditions, it may be desirable to engage the first clutch later than the second clutch to compensate for the change in relative inertia of the clutches.

What is needed therefore is a method and apparatus for adaptively engaging clutches based on engine load which overcomes the above-mentioned drawbacks.

DISCLOSURE OF THE INVENTION

In accordance with a first embodiment of the present invention, there is provided a drive line assembly for a work machine. The drive line assembly includes an engine driving an engine output shaft and an engine speed sensor which generates engine speed signals indicative of a speed of the engine output shaft. The drive line assembly further includes a fuel injector operable to regulate fuel flow to the engine and a transmission driven by the engine output shaft and having a first on-coming clutch. The drive line assembly yet further includes a controller operable to determine the engine speed from the engine speed signals and determine the fuel flow through the fuel injector. The controller is further operable to determine an engine load based on the fuel flow and a predetermined maximum fuel flow for the engine at the engine speed and control engagement of the first on-coming clutch based on the engine load.

In accordance with a second embodiment of the present invention, there is provided a method for controlling a drive line assembly. The drive line assembly includes an engine driving an engine output shaft, an engine speed sensor which generates engine speed signals indicative of a speed of the engine output shaft, a fuel injector operable to regulate fuel flow to the engine, a transmission driven by the engine output shaft and having a first on-coming clutch, and a controller. The method includes the steps of determining engine speed with the controller based on the engine speed signals and determining the fuel flow with the controller. The method further includes the steps of calculating an engine load with the controller based on fuel flow and a predetermined maximum fuel flow for the engine at the engine speed and adaptively controlling the engagement of the first on-coming clutch based on the engine load with the controller.

BRIEF DESCRIPTION OF THE DRAWINGS

FIG. 3 is a graph of the commanded position of a first off-going clutch relative to the commanded position of a first on-coming clutch at a no load condition;

FIG. 4 is a graph similar to FIG. 3, but showing a heavy load condition;

FIG. 5 is a graph of the commanded position of a first off-going clutch and a second off-going clutch relative to a commanded position of a first on-coming clutch and a second on-coming clutch at a no load condition; and FIG. 6 is a graph similar to FIG. 5, but showing a heavy load condition.

BEST MODE FOR CARRYING OUT THE INVENTION

Figure 1:
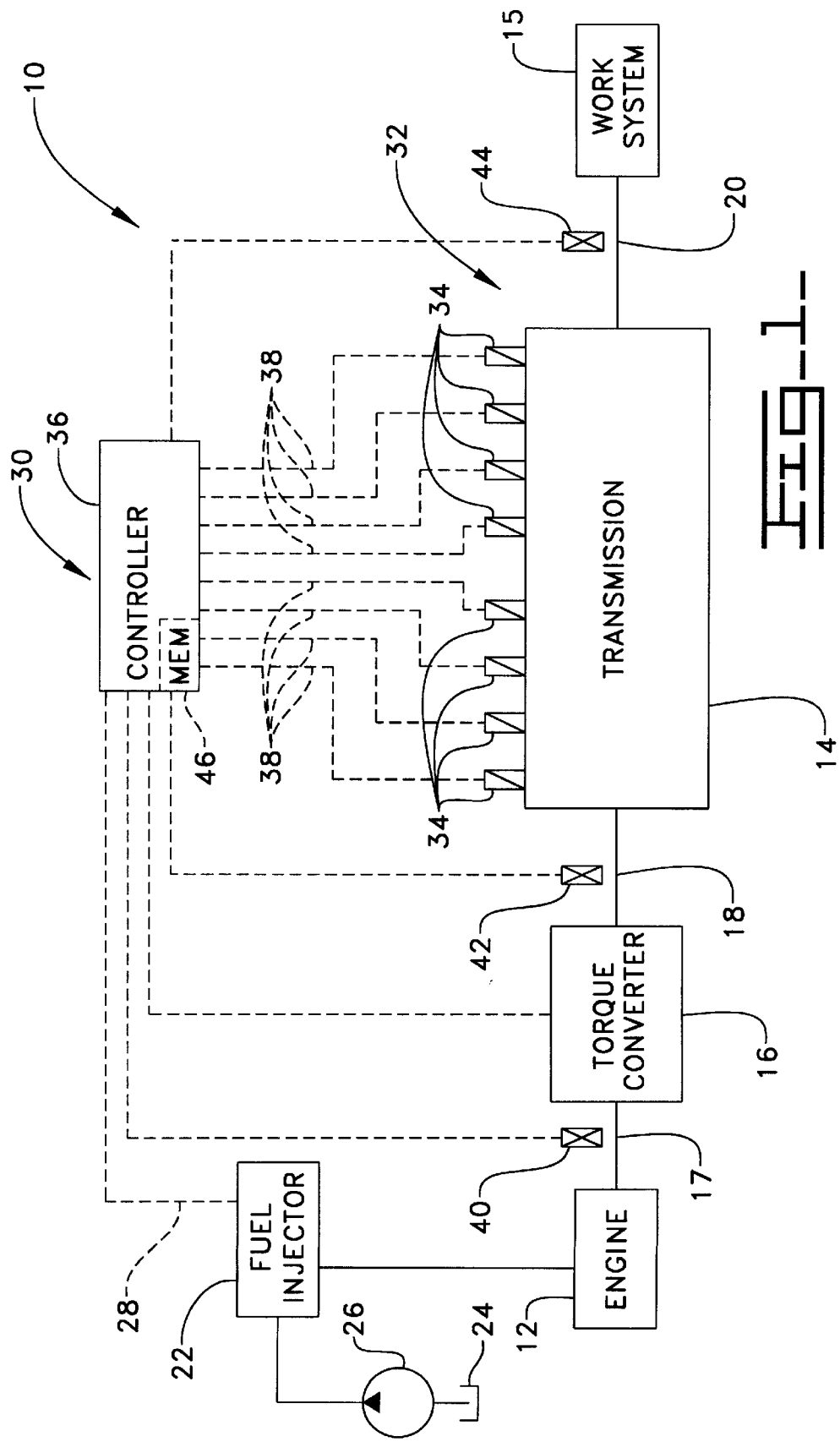
FIG. 1 is a schematic view of a transmission assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a drive train 10 that incorporates the features of the present invention therein. The drive train 10 includes an internal combustion engine 12, a multi-speed powershift transmission 14, and a work system 15. The work system 15 may include drive wheels (not shown), differentials (not shown), axles (not shown) or other mechanisms used to propel a work machine (not shown). Additionally, a fluidic torque converter 16 may also be provided between the engine 12 and the transmission 14. In particular, the input shaft 18 of the transmission 14 is driven by the engine 12 via an engine drive shaft 17 and the torque converter 16. The output shaft 18 drives the transmission 14 which in turn drives a transmission output shaft 20. The transmission output shaft 20 in turn drives the work system 15 which propels the work machine.

The drive train 10 further includes a fuel injector 22 which controllably supplies fuel to the engine 12. In particular, low pressure fuel is drawn from a fuel reservoir 24 by a fuel pump 26 which advances fuel at a high pressure to the fuel injector 22. The fuel injector 22 controls the amount of fuel advanced to the engine 12 in response to control signals received via a signal line 28.

The transmission 14 includes a number of gear ratios which can be selectively engaged or disengaged from the transmission output shaft 20 during operation of the drive train 10. The transmission 14 includes a number of clutches (not shown) which are either engaged or disengaged to select a gear ratio. Shifts between gear ratios may be either "single clutch shifts" whereby a single clutch is disengaged and a single clutch is engaged to complete a shift between gear ratios or "double clutch shifts" whereby two clutches are disengaged and two clutches are engaged to complete the shift between gear ratios.

The drive train 10 further includes a control apparatus 30. The control apparatus 30 includes an actuator assembly 32 having a number of actuators 34. Each actuator 34 is operable to selectively engage or disengage one of clutches of the transmission 14 in response to a control signal received via a respective signal line 38. In particular, each actuator 34 controls the pressure of fluid supplied to a respective one of the clutches of the transmission 12. Controlling the fluid pressure supplied to a respective clutch allows precise control on the timing and rate at which the clutches are engaged and disengaged.

The control apparatus 30 further includes a controller 36 which receives operator inputs and generates shift signals which are directed to the actuators 34 via the signal lines 38. In particular, to effect a single clutch upshift, the controller 36 generates control signals via the signal lines 38 which causes a respective actuators 34 to disengage a first off-going clutch and engage a first on-coming clutch. Similarly, to effect a double clutch upshift, the controller 36 generates control signals via the signal lines 38 which causes a respective actuators 34 to disengage the first off-going clutch, disengage a second off-going clutch, engage the first on-coming clutch, and engage a second on-coming clutch.

The controller 36 may also receive various other input signals representative of the work machine system parameters, including an engine speed signal from an engine speed sensor 40, a transmission input speed signal from a transmission input speed sensor 42, and a transmission output speed signal from a transmission output speed sensor 44. The sensors 40, 42, 44 are conventional electrical transducers typically of the magnetic speed pickup type.

Internally, the controller 36 comprises a number of conventional devices including a microprocessor (not shown), a timer (not shown) input/output devices (not shown) and a memory device 46. Stored in the memory device 46 are various load parameters, clutch engagement rates, and clutch overlap periods.

Figure 2:
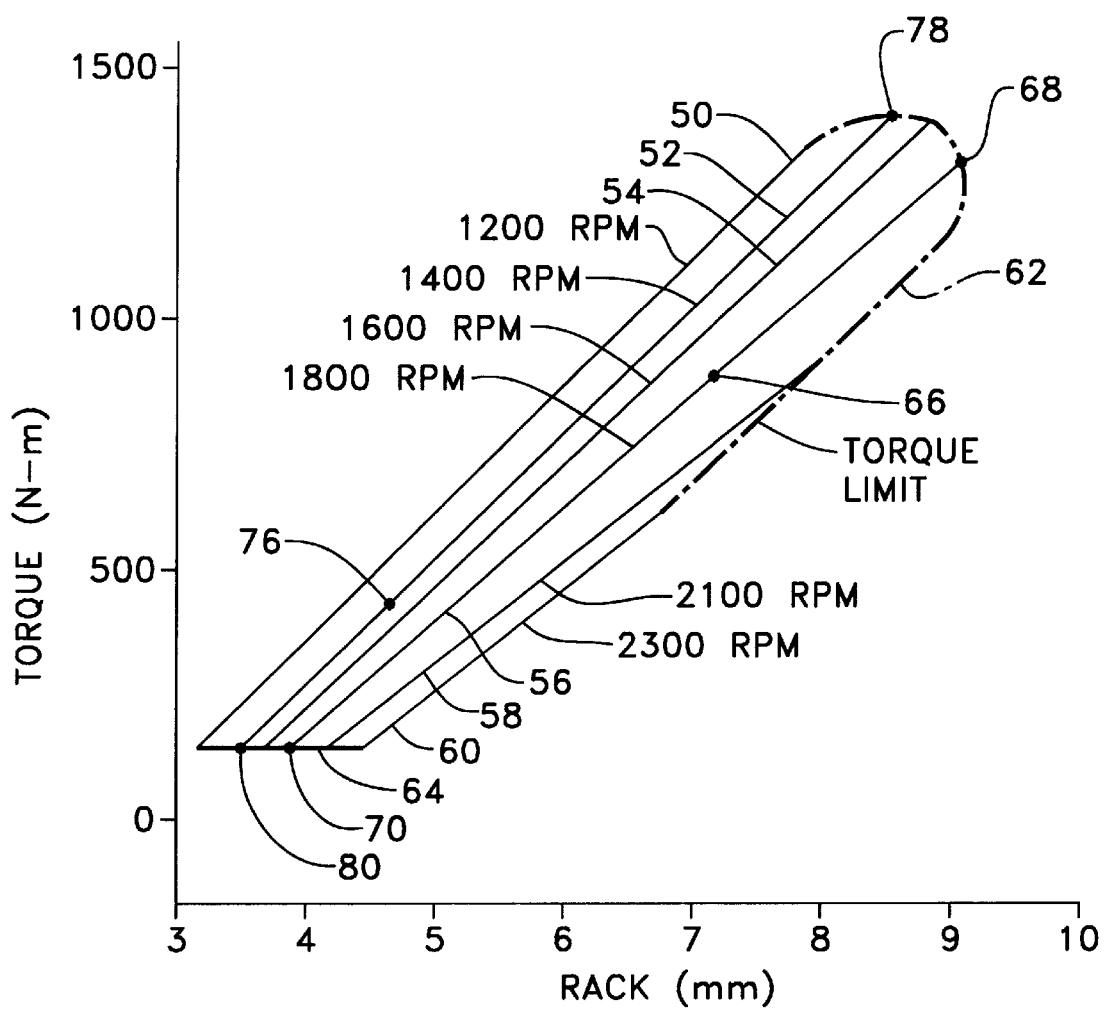
FIG. 2 is a graph of engine torque versus fuel flow command.

Referring now to FIG. 2, there is shown a load map, or engine load (torque) versus rack position for the engine 12. The rack position is a command directed to the fuel injector 22 by the controller 36 via the signal line 28 which controls the flow of fuel from the fuel injector 22 to the engine 12. The rack position may or may not be proportional to the flow of fuel which the fuel injector 22 provides to the engine 12. The engine 12 has a number of operating lines corresponding to the engine speed obtained from the engine speed sensor 40. In particular, the line 50 corresponds to an engine speed of 1200 RPM, the line 52 corresponds to an engine speed of 1400 RPM, the line 54 corresponds to an engine speed of 1600 RPM, the line 56 corresponds to an engine speed of 1800 RPM, the line 58 corresponds to an engine speed of 2100 RPM, and the line 60 corresponds to an engine speed of 2300 RPM. The dotted line 62 represents the maximum torque output of the engine 12 for respective engine speeds whereas the line 64 represents a minimum torque output of the engine 12 for respective engine speeds.

Engine load is calculated as the actual rack position (transmitted via the signal line 28) less rack position of the minimum torque output (line 64) as a percentage of the maximum rack position (line 62) for the engine speed less rack position of the minimum torque output (line 64) for a given engine speed. For example, if the engine is operating at a speed of 1800 RPM, a point 68 represents 100% (or maximum) engine load and a rack position of approximately 9.2 mm and the point 70 represents 0% (or minimum) engine load and a rack position of approximately 3.8 mm. The calculated engine load of a point 66 having a rack position of approximately 7.0 mm is (7.0 mm−3.8 mm)/(9.2 mm−3.8 mm) or approximately 60%, a relatively heavy load. For further example, if the engine is operating at a speed of 1400 RPM, a point 78 represents 100% (or maximum) engine load and a rack position of approximately 8.4 mm and the point 80 represents 0% (or minimum) engine load and a rack position of approximately 3.4 mm. The calculated load of a point 76 having a rack position of approximately 4.4 mm is (4.4 mm−3.4 mm)/(8.4 mm−3.4 mm) or approximately 20%, a relatively light load.

Referring now to FIG. 3, there is shown a commanded fluid pressure which the controller 38 commands the respective actuators 34 to supply in response to a single clutch shift command during a no load condition such as the points 70,80 of FIG. 2. The line 90 represents the commanded pressure supplied to the first off-going clutch. The line 92 represents the commanded pressure supplied to the first on-coming clutch. The first on-coming clutch is engaged at a relatively slow rate $r_1$. Both the first off-going clutch and the first on-coming clutch are engaged during the relatively short first overlap period 94. The shift from one gear to another by engaging the first on-coming clutch at the relatively slow rate $r_1$ and a relatively short first overlap period 94 can be completed with little or no torque interruption because no load is being transmitted by the transmission 12.

Referring now to FIG. 4, there is shown the commanded fluid pressure which the controller 38 commands the respective actuators 34 to supply in response to a single clutch shift command during a high load condition such as the point 66 of FIG. 2. The line 90 represents the commanded pressure supplied to the first off-going clutch. The line 92 represents the commanded pressure supplied to the first on-coming clutch. The first on-coming clutch is engaged at a relatively high rate $r_2$. Both the first off-going clutch and the first on-coming clutch are engaged during the relatively long first overlap period 99. The shift from one gear to another by engaging the first on-coming clutch at the relatively rapid rate $r_2$ and a relatively long first overlap period 99 is necessitated to prevent torque interruption as the transmission 12 is operated under high load conditions. Thus, it should be appreciated that higher loads require a larger first overlap period 99 and a more rapid clutch engagement rate $r_2$ whereas lower loads require a shorter first overlap period 94 and a less rapid clutch engagement rate $r_1$.

Referring now to FIG. 5, there is shown the commanded fluid pressure which the controller 38 commands the respective actuators 34 to supply in response to a double clutch shift command during a no load condition such as the points 70,80 of FIG. 2. The line 90 represents the commanded pressure supplied to the first off-going clutch. The line 91 represents the commanded pressure supplied to the second off-going clutch. The line 92 represents the commanded pressure supplied to the first on-coming clutch. The line 93 represents the commanded pressure supplied to the second on-coming clutch. Both the first on-coming clutch and the second on-coming clutch are engaged at a relatively slow rate $r_1$. However, it should be appreciated that the first on-coming clutch and the second on-coming clutch could be engaged at different rates. Both the first off-going clutch and the first on-coming clutch are engaged during the relatively short first overlap period 94 whereas the second off-going clutch and the second on-coming clutch are engaged during the relatively short second overlap period 95.

Referring now to FIG. 6, there is shown the commanded fluid pressure which the controller 38 commands the respective actuators 34 to supply in response to a double clutch shift command during a high load condition such as the point 66 of FIG. 2. The line 90 represents the commanded pressure supplied to the first off-going clutch. The line 91 represents the commanded pressure supplied to the first off-going clutch. The line 92 represents the commanded pressure supplied to the first on-coming clutch. The line 93 represents the commanded pressure supplied to the second on-coming clutch. Both the first on-coming clutch and the second on-coming clutch are engaged at a relatively rapid rate $r_2$. However, it should be appreciated that the first on-coming clutch and the second on-coming clutch could be engaged at different rates. Both the first off-going clutch and the first on-coming clutch are engaged during the relatively long first overlap period 99 (compared to the first overlap period 94 of FIG. 5) whereas the second off-going clutch and the second on-coming clutch are engaged during the relatively long second overlap period 100 (compared to the second overlap period 95 of FIG. 5).

It should appreciated that varying the first overlap from the period 94 to the period 99 independently of the varying the second overlap period 95 to the period 100 varies the timing of the engagement of the second on-coming clutch relative to the engagement of the first on-coming clutch. Varying the timing of the second on-coming clutch relative to the first on-coming clutch is necessitated by the differences in inertia driving the clutches during a double clutch shift. In particular, the first on-coming clutch may be driven the load, such as the weight of the work machine, whereas the second on-coming clutch may be driven by the engine 12. Under the heavy load shown in FIG. 6, it is necessary that the second overlap period 100 is larger than the period 99 because the inertia of the transmission components driven by the load may be greater than the inertia of the transmission components driven by the engine 12. Similarly, under the no load condition shown in FIG. 6, it is necessary that the first overlap period 99 is larger than the second overlap period 100 because the inertia of the transmission components driven by the engine 12 may be greater than the inertia of the transmission components driven by the load.

INDUSTRIAL APPLICABILITY

In operation, using an embodiment of the present invention, the load on the engine 12 is determined from the actual fuel flow rate, engine speed, fuel flow rate at minimum torque output, and fuel flow rate at maximum torque output. The point 66 represents a 60% or high load, whereas the point 70 represents a no load condition (see FIG. 2).

During a single clutch shift at low loads, the controller 38 generates commands signals which (i) cause the first on-coming clutch to be engaged at the relatively slow rate $r_1$ and (ii) cause a relatively short first overlap period 94 between the first off-going clutch and the first on-coming clutch (see FIG. 3). As the load increases to a high load condition, the controller 38 generates commands signals which (i) cause the first on-coming clutch to be engaged at the relatively rapid rate $r_2$ and (ii) cause a relatively long first overlap period 99 between the first off-going clutch and the first on-coming clutch (see FIG. 4).

During a double clutch shift at low loads, the controller 38 generates commands signals which cause the first on-coming clutch and the second on-coming to be engaged at the relatively slow rate $r_1$. In addition, the controller generates command signals which cause the relatively short first overlap period 94 between the first off-going clutch and the first on-coming clutch and the relatively short second overlap period 95 between the second off-going clutch and the second on-coming clutch (see FIG. 5). As the load increases to a high load condition, the controller 38 generates commands signals which cause the first on-coming clutch and the second on-coming clutch to be engaged at the relatively rapid rate $r_2$. The controller further generates command signals which cause the first overlap period 99 between the first off-going clutch and the first on-coming clutch and command the second overlap period 100 between the second off-going clutch and the second on-coming clutch. The second overlap period 100 is varied independently of the first overlap period 99 so as to account for differences in inertia of respective components of the transmission. Varying the second overlap period 100 independently of the first overlap period 99 also varies the timing of the engagement of the second on-coming clutch relative to the engagement of the first on-coming clutch (see FIG. 6).

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A drive line assembly for a work machine comprising:

an engine driving an engine output shaft;

an engine speed sensor which generates engine speed signals indicative of a speed of said engine output shaft;

a fuel injector operable to regulate fuel flow to said engine;

a transmission driven by said engine output shaft and having a first on-coming clutch; and a controller operable to (i) determine said engine speed from said engine speed signals (ii) determine said fuel flow through said fuel injector, (iii) determine an engine load based on said fuel flow and a predetermined maximum fuel flow for said engine at said engine speed, and (iv) control engagement of said first on-coming clutch based on said engine load.

2. The apparatus of claim 1, wherein said controller determines said fuel flow based on a rack position of said fuel injector.

3. The apparatus of claim 1, wherein said controller controls a rate at which said first on-coming clutch is engaged.

4. The apparatus of claim 3, further comprising an actuator which controls said fluid pressure supplied to said first on-coming clutch, wherein said rate at which said first on-coming clutch is engaged is controlled by varying fluid pressure said actuator supplies to said first on-coming clutch.

5. The apparatus of claim 3 wherein:

said rate is increased at higher engine loads, and said rate is decreased at lower engine loads.

6. The apparatus of claim 1, further comprising a first off-going clutch, wherein said controller is further operable to control said disengagement of said first off-going clutch based on said engine load.

7. The apparatus of claim 6, wherein:

said controller is further operable control a first overlap period where both of said first on-coming clutch and said first off-going clutch are engaged, said first overlap period is increased at higher engine loads, and said first overlap period is decreased at lower engine loads.

8. The apparatus of claim 1 further comprising a second on-coming clutch, wherein said controller is further operable to control engagement of said second on-coming clutch.

9. The apparatus of claim 8, wherein said controller is further operable control timing of said engagement of said second on-coming clutch relative to said engagement of said first on-coming clutch.

10. The apparatus of claim 9, wherein:

said second on-coming clutch is engaged prior to said first on-coming clutch at higher engine loads, and said second on-coming clutch is engaged subsequent to said first on-coming clutch at lower engine loads.

11. The apparatus of claim 8, further comprising a second off-going clutch, wherein:

said controller is further operable control a second overlap period where both of said second on-coming clutch and said second off-going clutch are engaged, said second overlap period is increased at higher engine loads, and said second overlap period is decreased at lower engine loads.

12. A method for controlling a drive line assembly having (i) an engine driving an engine output shaft, (ii) an engine speed sensor which generates engine speed signals indicative of a speed of the engine output shaft, (iii) a fuel injector operable to regulate fuel flow to the engine, (iv) a transmission driven by the engine output shaft and having a first on-coming clutch, and (v) a controller, comprising the steps of:

determining engine speed with the controller based on the engine speed signals;

determining the fuel flow with the controller;

calculating an engine load with the controller based on fuel flow and a predetermined maximum fuel flow for the engine at the engine speed; and adaptively controlling the engagement of the first on-coming clutch based on the engine load with the controller.

13. The method of claim 12, wherein the fuel flow determining step includes the step of calculating a rack position of the fuel injector.

14. The method of claim 12, wherein the controlling step includes the step of controlling a rate at which the first on-coming clutch is engaged.

15. The method of claim 14, the drive line further having an actuator which controls the fluid pressure supplied to the first on-coming clutch, the controlling step further comprising the step of varying fluid pressure which the actuator supplies to the first on-coming clutch.

16. The method of claim 14, further including the steps of:

increasing the rate at higher engine loads; and decreasing the rate at lower engine loads.

17. The method of claim 12, the drive line further comprising a first off-going clutch, further including the step of:

controlling the disengagement of the first off-going clutch based on the engine load.

18. The method of claim 17, further comprising the step of:

controlling a first overlap period where both the first on-coming clutch and the first off-going clutch are engaged;

increasing the first overlap period at higher engine loads; and decreasing the first overlap period at lower engine loads.

19. The method of claim 12, the drive line further having a second on-coming clutch, further including the step of controlling engagement of the second on-coming clutch based on the engine load.

20. The method of claim 19, further including the step of controlling timing of the engagement of the second on-coming clutch relative to engagement of the first on-coming clutch.

21. The method of claim 20, the controlling timing step further including the steps of:

engaging the second on-coming clutch prior to engaging the first on-coming clutch at higher engine loads; and engaging the second on-coming clutch subsequent to engaging the first on-coming clutch at lower engine loads.

22. The method of claim 19, the drive line assembly further having a second off-going clutch, further comprising the step of:

controlling a second overlap period where both the second on-coming clutch and the second off-going clutch are engaged;

increasing the second overlap period at higher engine loads; and decreasing the second overlap period at lower engine loads.

* * * * *